(12) United States Patent
Tsuruma et al.

(10) Patent No.: US 10,120,245 B2
(45) Date of Patent: *Nov. 6, 2018

(54) LIQUID CRYSTAL DISPLAY DEVICE

(71) Applicant: Japan Display Inc., Tokyo (JP)

(72) Inventors: Takeyuki Tsuruma, Tokyo (JP);
Hidemasa Yamaguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,032

(22) Filed: Nov. 11, 2016

(65) Prior Publication Data
US 2017/0059950 A1    Mar. 2, 2017

Related U.S. Application Data

(63) Continuation of application No. 14/573,077, filed on Dec. 17, 2014, now Pat. No. 9,523,893.

(30) Foreign Application Priority Data

Dec. 18, 2013  (JP) ................................. 2013-260734

(51) Int. Cl.
*G02F 1/1343* (2006.01)
*G02F 1/1368* (2006.01)
(Continued)

(52) U.S. Cl.
CPC ...... *G02F 1/134336* (2013.01); *G02F 1/1368* (2013.01); *G02F 1/133345* (2013.01); *G02F 1/134363* (2013.01); *G02F 1/13439* (2013.01);
*G02F 1/136227* (2013.01); *G02F 2001/134372* (2013.01); *G02F 2201/123* (2013.01); *G02F 2202/103* (2013.01)

(58) Field of Classification Search
None
See application file for complete search history.

(56) References Cited

U.S. PATENT DOCUMENTS

2007/0070273 A1    3/2007 Yoshida et al.
2007/0236640 A1    10/2007 Kimura
(Continued)

FOREIGN PATENT DOCUMENTS

JP    2007-86576 A    4/2007
JP    2007-240911 A    9/2007
(Continued)

*Primary Examiner* — Michelle Mandala
(74) *Attorney, Agent, or Firm* — Typha IP LLC

(57) ABSTRACT

In order to increase the transmittance around a pixel and to increase the brightness of the screen in an IPS mode liquid crystal display device, a pixel electrode with a slit is formed on a common electrode through an interlayer insulating film. An opening is formed in the common electrode on the outside of the end portion of the pixel electrode as seen in a plane view. Because of the presence of the opening, the electric field lines from the end portion of the pixel electrode reach the layer above the liquid crystal layer and reach further away from the end portion of the pixel electrode, so that it is possible to increase the control ability to the liquid crystal around the pixel. As a result, the pixel transmittance can be increased as a whole and the brightness of the screen can be increased.

12 Claims, 14 Drawing Sheets

(51) Int. Cl.
    *G02F 1/1333*     (2006.01)
    *G02F 1/1362*     (2006.01)

(56)            References Cited

U.S. PATENT DOCUMENTS

| | | | |
|---|---|---|---|
| 2007/0279355 A1* | 12/2007 | Hirata | G09G 3/3655 |
| | | | 345/87 |
| 2008/0001883 A1 | 1/2008 | Kim et al. | |
| 2008/0303024 A1 | 12/2008 | Song et al. | |
| 2009/0009704 A1 | 1/2009 | Tomioka | |
| 2009/0201455 A1 | 8/2009 | Murai | |
| 2011/0080549 A1 | 4/2011 | Jung et al. | |
| 2012/0176561 A1* | 7/2012 | Kim | G02F 1/134363 |
| | | | 349/46 |

FOREIGN PATENT DOCUMENTS

| | | | |
|---|---|---|---|
| JP | 2009-116058 A | 5/2009 | |
| JP | 2009-150952 A | 7/2009 | |

* cited by examiner

LIQUID CRYSTAL DISPLAY DEVICE

CROSS-REFERENCE TO RELATED APPLICATIONS CLAIM OF PRIORITY

This application is a continuation of U.S. patent application Ser. No. 14/573,077 filed on Dec. 17, 2014. Further, this application claims priority from Japanese Patent Application No. 2013-260734 filed on Dec. 18, 2013, the contents of which are hereby incorporated by reference into this application.

BACKGROUND

The present invention relates to a liquid crystal display device, and more particularly, to an IPS mode liquid crystal display device with excellent viewing angle characteristics and improved brightness.

A display device includes a TFT substrate in which pixels each having a pixel electrode, a thin film transistor (TFT), and the like are arranged in a matrix form. Further, there is provided a counter substrate opposite the TFT substrate, in which color filters, and the like, are formed at positions corresponding to the pixel electrodes of the TFT substrate. Further, a liquid crystal is interposed between the TFT substrate and the counter substrate. Then, an image is formed by controlling the transmittance of light through each pixel by the liquid crystal molecules.

Liquid crystal display devices are flat and lightweight and have been applied in various fields. Small liquid crystal display devices are widely used in mobile phones, digital still cameras (DSC), or other portable devices. The viewing angle characteristics are a problem in the liquid crystal display device. The viewing angle characteristics are a phenomenon that the brightness or the chromaticity varies when the screen is seen from the front and from an oblique angle. The viewing angle characteristics are excellent in the In Plane Switching (IPS) mode that drives liquid crystal molecules by an electric field in the horizontal direction.

Among various types in the IPS mode, for example, there is a mode in which a common electrode is formed in a matted manner and a comb-shaped pixel electrode is provided on the common electrode with an insulating film interposed therebetween, to rotate liquid crystal molecules by the electric field generated between the pixel electrode and the common electrode. This type of mode can increase the transmittance and is currently the mainstream mode. In order to increase the transmittance of a pixel in a liquid crystal display device having the structure described above, there are structures in which the cross-sectional shape of the common electrode is changed, such as those disclosed in Patent Document 1 (Japanese Patent Application Laid-Open No. 2009-150952), Patent Document 2 (Japanese Patent Application Laid-Open No. 2007-86576), and Patent Document 3 (Japanese Patent Application Laid-Open No. 2007-240911). Further, Patent Document 4 (Japanese Patent Application Laid-Open No. 2009-116058) describes a structure in which an opening is provided in the common electrode to adjust the capacity between the pixel electrode and the common electrode.

SUMMARY

FIG. 14 is a plan view of a pixel in an IPS mode liquid crystal display device. In FIG. 14, a pixel is formed in an area surrounded by scanning lines 10 and video signal lines 20. A pixel electrode 110 of a rectangular shape with a slit 40 is formed in the pixel. A common electrode 108 is formed in a planar shape below the pixel electrode 110 with an interlayer insulating film interposed therebetween. When a voltage is applied to the pixel electrode 110, electric field lines are generated from the pixel electrode 110 towards the common electrode, passing through the liquid crystal layer and through the slit 40 or the outside of the end portion of the pixel electrode 110.

The liquid crystal molecules are rotated by the components of the electric field lines in the direction parallel to the plane of the substrate, to control the transmittance of light through the liquid crystal layer. The density of the electric field lines is smaller in the slit 40 of the pixel electrode 110 than in the end portion of the pixel electrode 110. The electric field lines from the pixel electrodes 110 on both sides pass through the slit 40. However, the electric field line is only from one side of the end portion of the pixel electrode 110. For this reason, the intensity of the electric field in the vicinity of the video signal line is very small.

Thus, the liquid crystal molecules around the pixel electrode 110 have not been fully used and the transmittance has been insufficient in the past. The problem to be solved by the present invention is to increase the transmittance of pixels, that is, the brightness of the screen by fully using the liquid crystal also around the pixel electrode 110.

The present invention is made to overcome the above problems, specific means are as follows:

(1) There is provided a liquid crystal display device including a TFT substrate in which pixels each having a pixel electrode formed in an area surrounded by scanning lines extending in a first direction and being arranged in a second direction, are arranged in a matrix form. Then, a liquid crystal layer is interposed between the TFT substrate and a counter substrate. A common electrode is formed in the lower layer of the pixel electrode through an interlayer insulating film. An opening having a long axis in the second direction is formed in the common electrode as seen in a plan view, on both outer sides of the end portion of the pixel electrode in the first direction. Then, the opening is not formed in any area other than both outer sides of the end portion of the pixel electrode in the first direction.

(2) In the liquid crystal display device described in (1), the opening does not overlap the video signal line as seen in a plan view.

(3) In the liquid crystal display device described in (1) or (2), the distance between the end portion of the pixel electrode in the first direction, and the end portion of the opening of the common electrode on the side far from the end portion of the pixel electrode in the first direction, is in the range of 0.25 to 5 μm.

(4) In the liquid crystal display device described in (3), the distance between the end portion of pixel electrode in the first direction, and the end portion of the opening of the pixel electrode of the common electrode on the side far from the end portion in the first direction, is in the range of 0.5 to 3 μm.

(5) In the liquid crystal display device described in (1), the pixel electrode has a slit, and the opening of the common electrode does not overlap the slit of the pixel electrode as seen in a plan view.

(6) In the liquid crystal display device described in (5), the opening does not overlap the video signal line as seen in a plan view.

(7) In the liquid crystal display device described in (5) or (6), the distance between the end portion of the pixel electrode in the first direction, and the end portion of the opening of the common electrode on the side far from the end portion of the pixel electrode in the first direction, is in the range of 0.25 to 5 μm.

(8) In the liquid crystal display device described in (7), the distance between the end portion of the pixel electrode in the first direction, and the end portion of the opening of the common electrode on the side far from the end portion of the pixel electrode in the first direction, is in the range of 0.5 to 3 μm.

DETAILED DESCRIPTION

Hereinafter, the present invention will be described in detail with reference to embodiments.

First Embodiment

Figure 1:
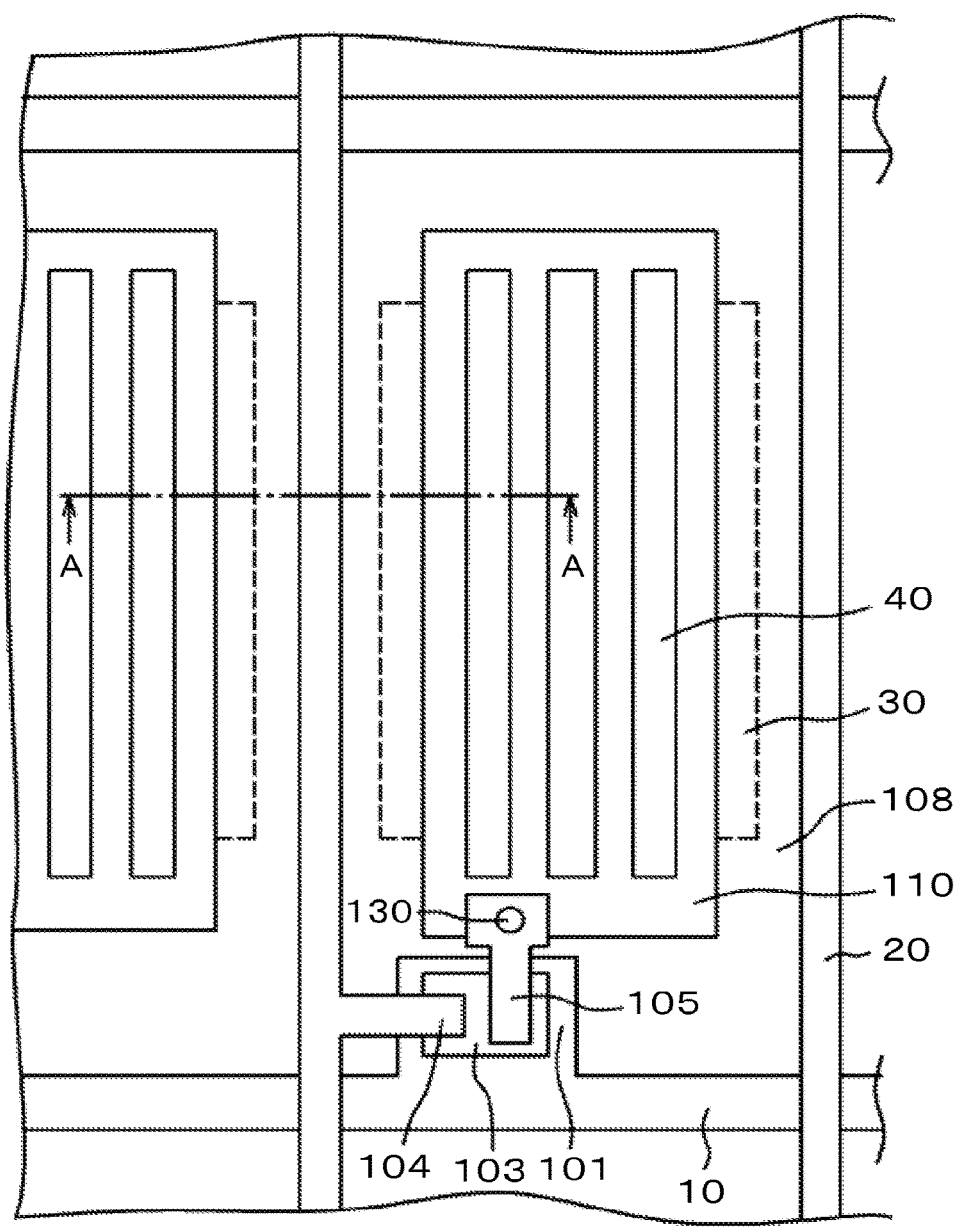
FIG. 1 is a plan view of a pixel of a liquid crystal display device according to the present invention.
Figure 2:
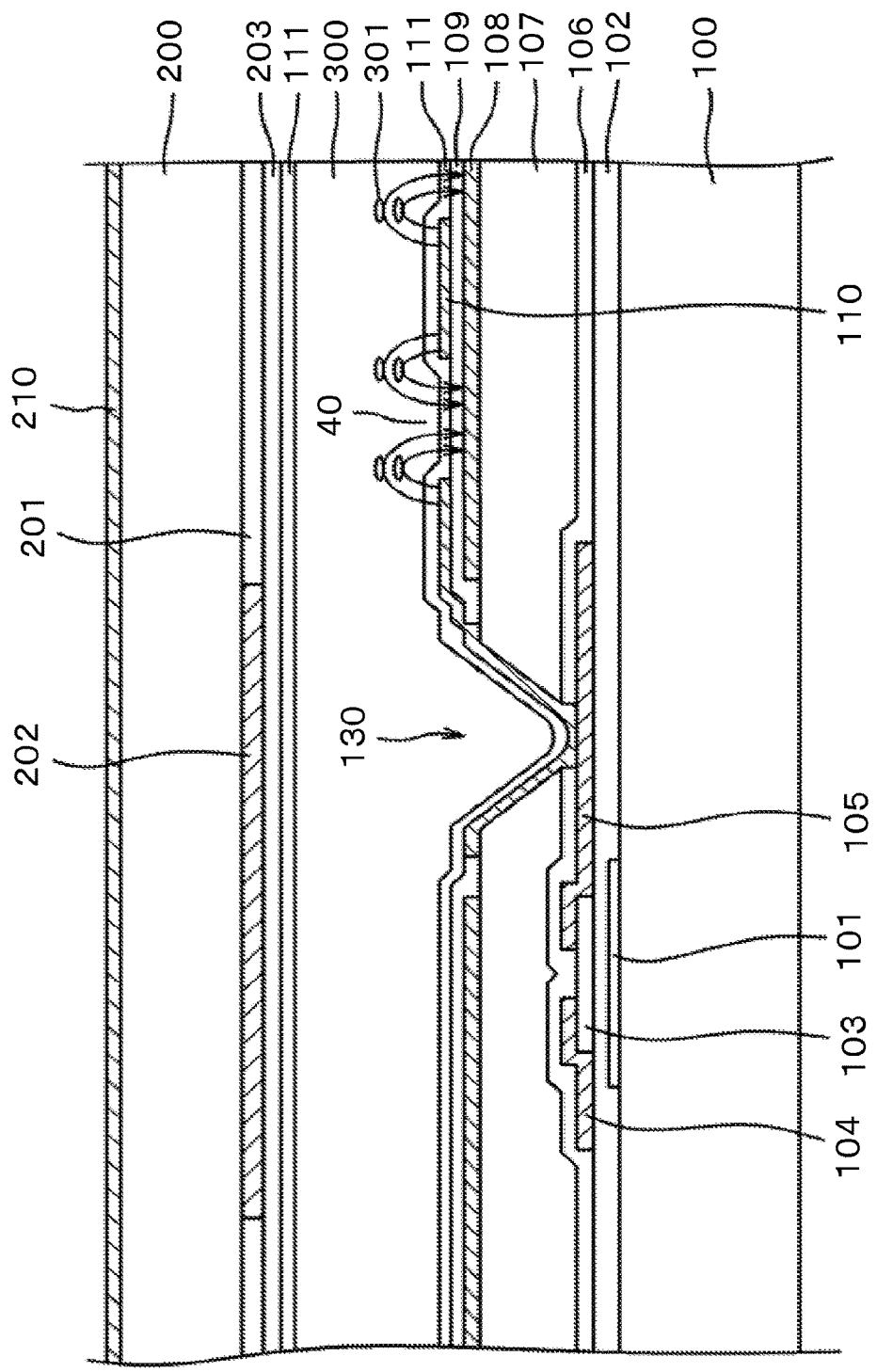
FIG. 2 is a cross-sectional view of the pixel shown in FIG. 1.
Figure 3:
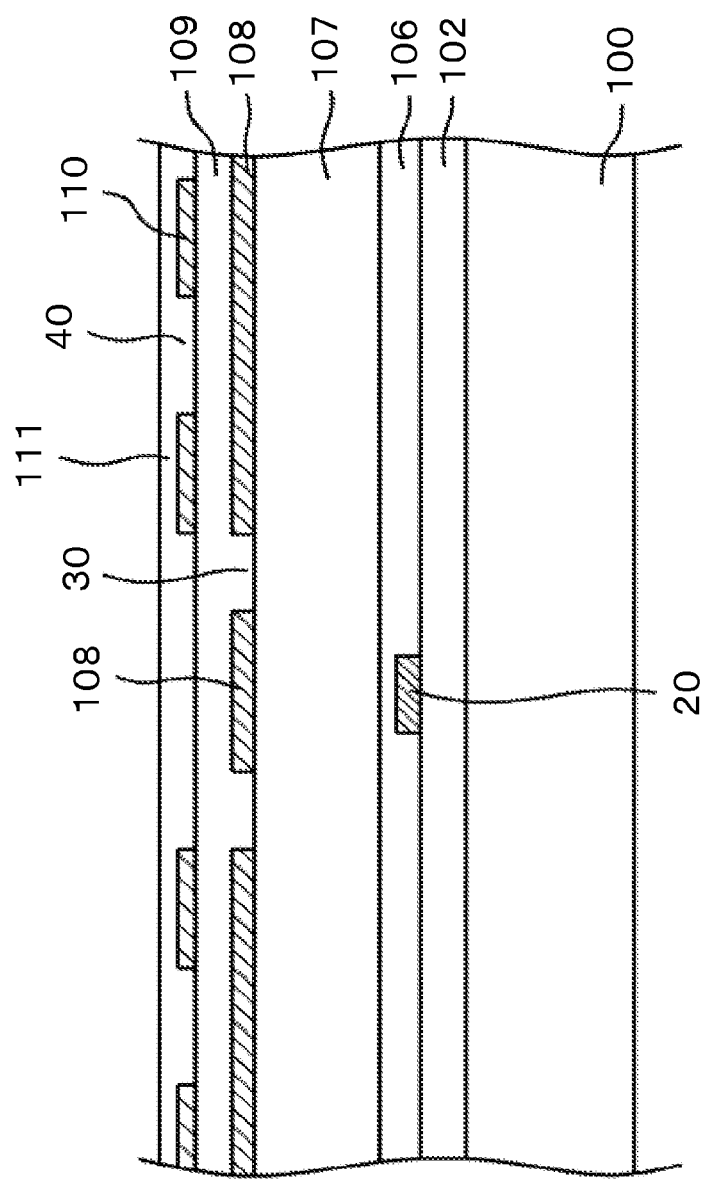
FIG. 3 shows the A-A cross section of FIG. 1.

FIG. 1 is a plan view of a pixel structure according to the present invention. FIG. 2 is a cross-sectional view of a pixel portion, and FIG. 3 is a cross-sectional view taken along line A-A of FIG. 1. First, the cross-sectional structure of FIG. 2 will be described. In FIG. 2, a gate electrode 101 is formed on a TFT substrate 100 formed of glass. Then, a gate insulating film 102 is formed so as to cover the TFT substrate 100 and the gate electrode 101. A semiconductor layer 103 is formed on the gate insulating film 102 above the gate electrode 101.

The semiconductor layer 103 is formed by a-Si. A source electrode 104 and a drain electrode 105 are formed facing each other on the semiconductor layer 103 through n+a-Si, not shown. With respect to the drain electrode and the source electrode, the names may be reversed as well. An inorganic passivation film 106 is formed so as to cover the semiconductor layer 103, the source electrode 104, and the drain electrode 105. Then, an organic passivation film 107 that also functions as a flattering film is formed on the inorganic passivation film 106. However, the inorganic passivation film may not necessarily be formed. The organic passivation film 107 is formed thick with a thickness of 1 to 3 μm.

A common electrode 108 is formed by ITO in a planar shape on the organic passivation film 107. An interlayer insulating film 109 is formed so as to cover the common electrode 108. Then, the pixel electrode 110 having the slit 40 is formed on the interlayer insulating film 109. The pixel electrode 110 is coupled to the drain electrode 105 through a through hole 130. An alignment film 111, which is used for an initial alignment of the liquid crystal, is formed so as to cover the pixel electrode 110. In FIG. 2, when a video signal is applied to the pixel electrode 110, electric field lines are generated between the pixel electrode 110 and the common electrode 108 as shown in the figure. Then, liquid crystal molecules 301 are rotated by the components of the electric field lines to control the light from the backlight.

The TFT substrate and a counter substrate 200 are provided with a liquid crystal layer 300 interposed therebetween. A color filter 201 is formed in an area corresponding to the pixel electrode 110 inside the counter substrate 200. Then, a black matrix 202 is formed between the color filters 201. An overcoat film 203 is formed so as to cover the color filters 201 and the black matrix 202. Then, the alignment film 111 is formed on the overcoat film 203. The common electrode is not formed on the side of the counter substrate 200, so that an external conductive film 210 of ITO is formed on the outside of the counter substrate 200 to shield the noise from the outside.

FIG. 2 shows a so-called bottom gate type TFT. However, there is also a top gate type TFT in which the gate electrode 102 is formed on the semiconductor layer 103. Further, the material of the semiconductor layer 103 is not limited to a-Si, and may also be poly-Si.

FIG. 1 is a plan view showing the pixel structure according to the present invention. In FIG. 1, the scanning lines 10 extend in the horizontal direction and are arranged at a predetermined pitch. The video signal lines 20 extend in the vertical direction and are arranged at a predetermined pitch. Each of the pixels is partitioned by two scanning lines and two video signal lines, in which the TFT, the pixel electrode 110, and the common electrode 108 are present.

In FIG. 1, the semiconductor layer 103 is formed on the gate electrode 101 branching from the scanning line 10 through the gate insulating film. The source electrode 104 branching from the video signal line, and the drain electrode 105 facing the source electrode 104 are formed on the semiconductor layer 103. The region between the source electrode 104 and the drain electrode 105 is the TFT channel region. The drain electrode 105 is electrically coupled to the pixel electrode 110 through the through hole 130 to provide a video signal to the pixel electrode 110.

The common electrode 108 is formed in a planar shape below the pixel electrode 110 as described in FIG. 2. When a signal voltage is applied to the pixel electrode 110, as shown in FIG. 2, the electric field lines pass through the liquid crystal layer 300 to reach the common electrode 108, through the slit 40 of the pixel electrode 110 and through the outside of the pixel electrode 110 (between the end portion of the pixel electrode on the side of the adjacent video signal line, and the adjacent video signal line). The liquid crystal is rotated by the electric field lines to control the transmittance of the liquid crystal layer.

The feature of the present invention is that the slit-like opening 30 (hereinafter also referred to as the opening) is formed in the common electrode 108 on both sides of the pixel electrode 110. The electric field lines from the end portion of the pixel electrode 110 can reach further away and expand the area to control the liquid crystal, because the opening 30 is formed. Thus, the transmittance around the pixel can be increased. As a result, the brightness of the screen can be increased.

FIG. 3 is a cross-sectional view taken along line A-A of FIG. 1. In FIG. 3, the gate insulating film 102 is formed on the TFT substrate 100, and the video signal line 20 extends in the direction perpendicular to the paper, on the gate insulating film 102. The inorganic passivation film 106 is formed so as to cover the video signal line 20. The organic passivation film 107 is formed on the inorganic passivation film 106. Then, the opening 30 of the common electrode 108 is formed in a slit-like shape at positions corresponding to both sides of the video signal line 20.

The interlayer insulating film 109 is formed so as to cover the common electrode 108. Then, the pixel electrode 110 with the slit 40 is formed on the interlayer insulating film 109. The feature of the present invention is that the opening 30 is formed in the common electrode 108 on both sides above the video signal line 20. Because of this opening 30, it is possible to increase the transmittance of the liquid crystal on the outside of the pixel electrode 110, in other words, on both sides of the video signal line 20. In FIG. 3, the width of the common electrode 108 on the video signal line 20 is greater than the width of the video signal line 20. In other words, the opening 30 of the common electrode 108 preferably should not overlap the video signal line 20 as seen in a plane view. This is to allow the common electrode 108 to shield the video signal passing through the video signal line 20.

Figure 5:
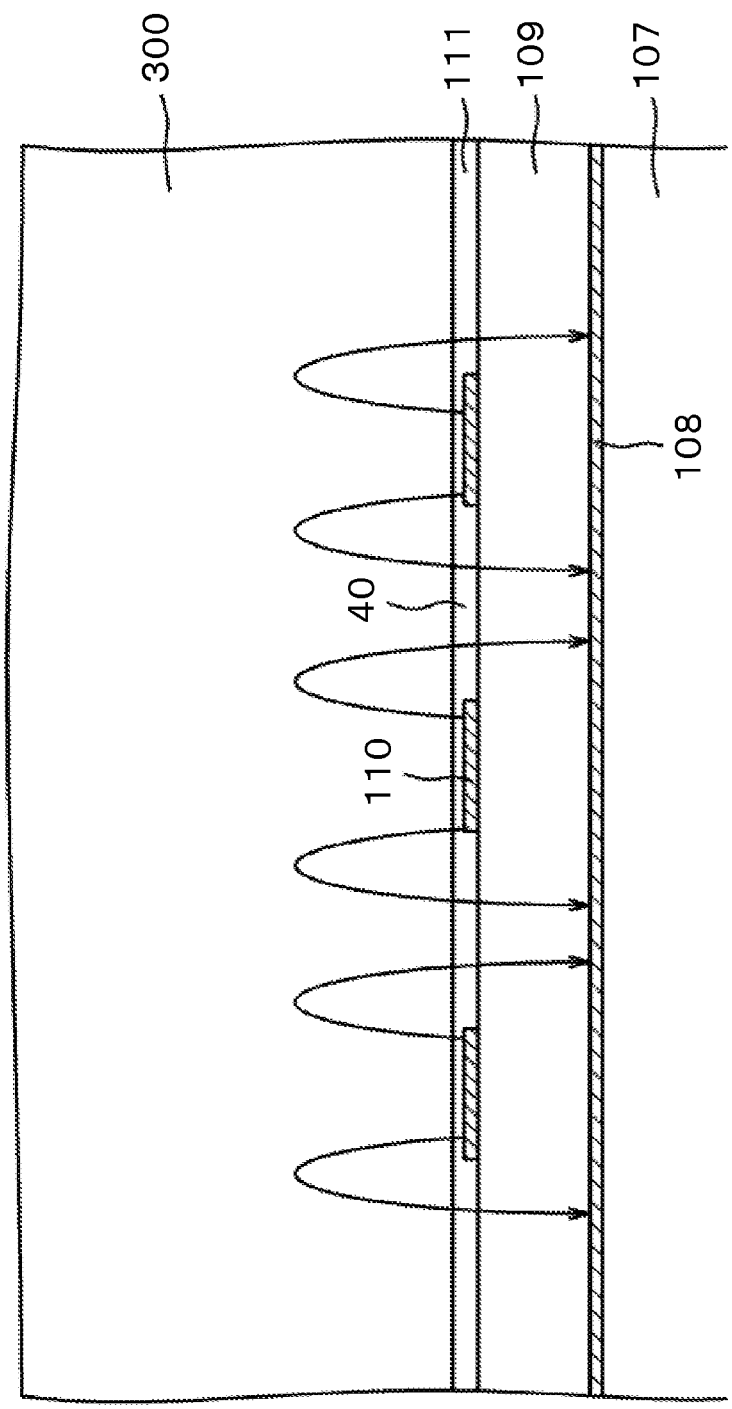
FIG. 5 is a cross-sectional view of a conventional example.

FIG. 5 is a cross-sectional view showing the state of the electric field lines between the pixel electrode 110 and the common electrode 108 within the pixel in the existing structure. In FIG. 5, the electric field lines from the pixel electrode 110 extend to the common electrode 108. The electric field lines are formed on both sides of the pixel electrode 110 at a position corresponding to the slit 40 of the pixel electrode 110. However, the electric field lines are formed only on one side of the end portion of the pixel electrode 110. Thus, in the existing structure, the liquid crystal molecules may not be completely driven on the outside of the pixel electrode 110.

Figure 4:
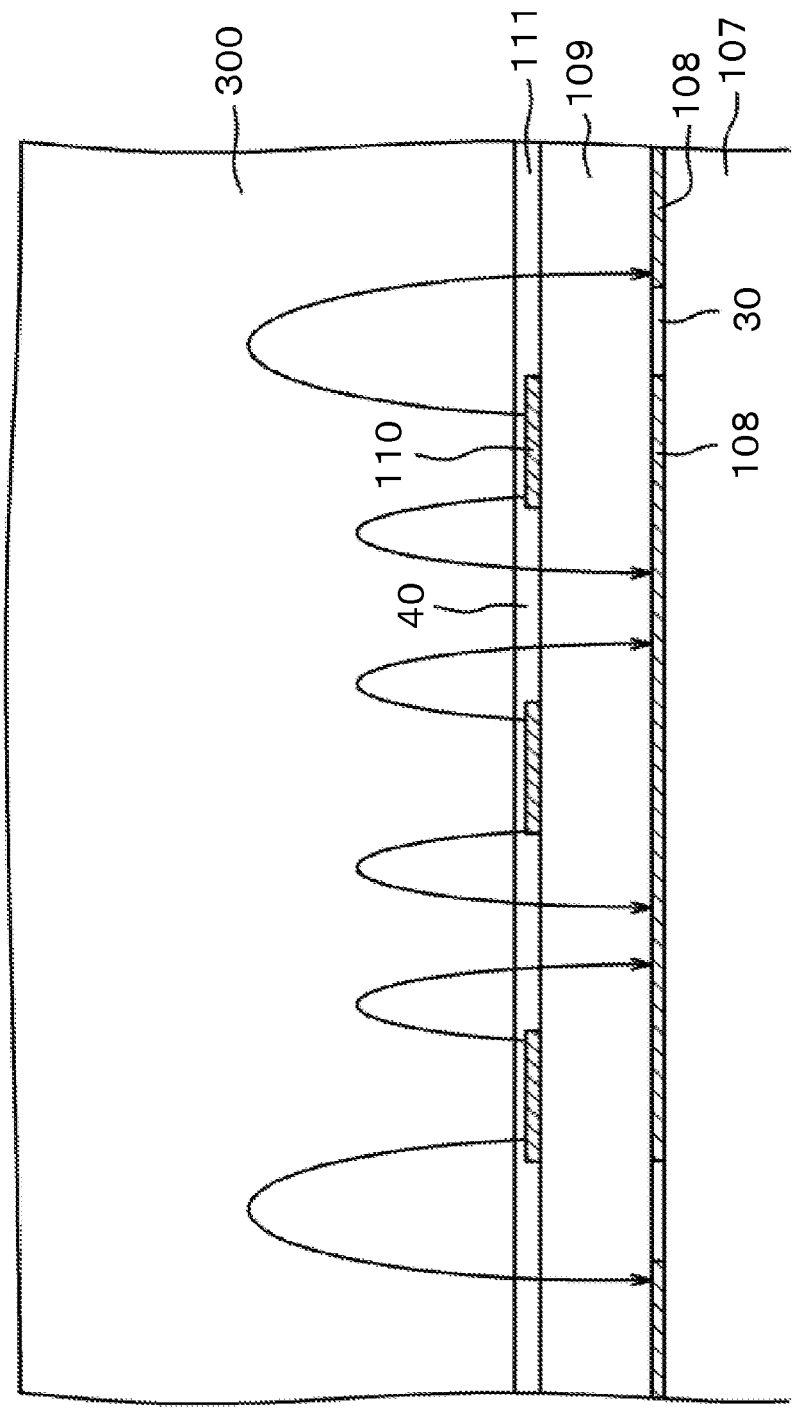
FIG. 4 is a cross-sectional view showing the principle of the present invention.

FIG. 4 is a cross-sectional view of the present invention. FIG. 4 is different from FIG. 5 in that the slit-like opening 30 is formed in the common electrode 108 at a position corresponding to the outside of the pixel electrode 110. The electric field lines from the end portion of the pixel electrode 110 pass through the layer above the liquid crystal layer 300, and reaches the remote common electrode 108, because the opening 30 is formed as described above. In this way, it is possible to drive the liquid crystal molecules 30 on the outside of the pixel electrode 110 more effectively than before. As a result, the pixel transmittance can be increased.

Figure 6:
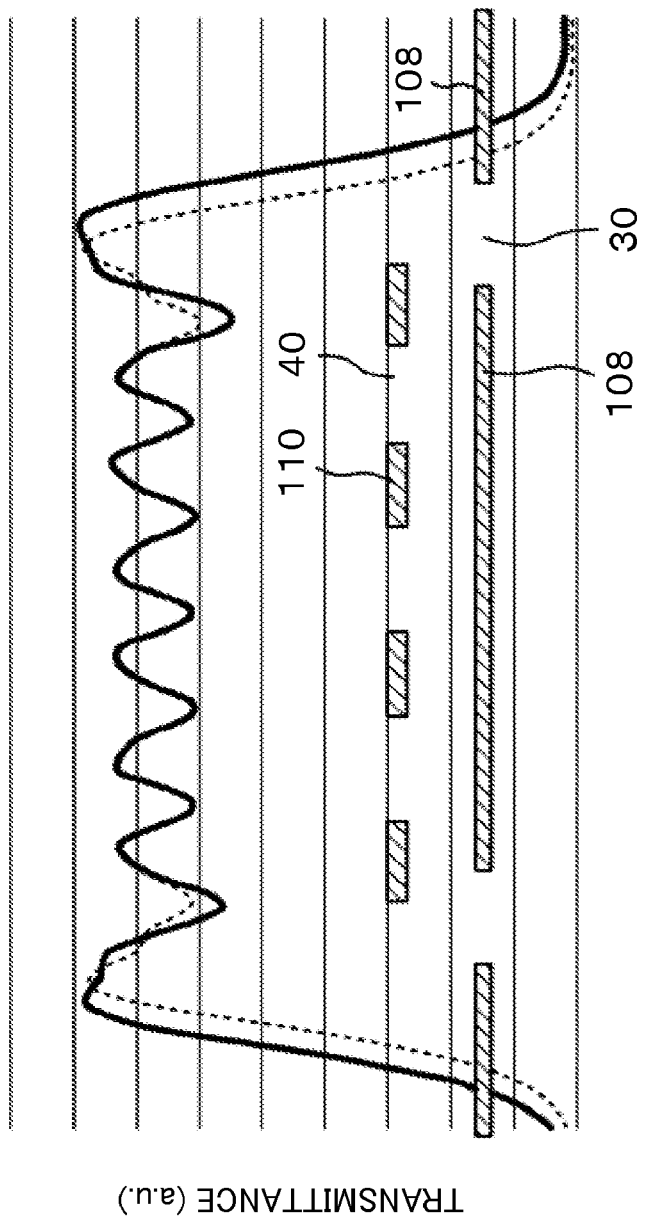
FIG. 6 is a comparison of the pixel transmittance in the present invention and in the conventional example.

FIG. 6 is a graph showing the difference in the pixel transmittance between when the opening 30 is formed in the common electrode 108 and when it is not. In FIG. 6, three slits are formed in the pixel electrode 110. In FIG. 6, the slide curve line represents the case of the present invention, in which the common electrode 108 is formed on the outside of the pixel electrode 110. In FIG. 6, the dotted curve line represents the case of the existing structure, in which no opening is formed in the common electrode 108. As shown in FIG. 6, according to the present invention, the transmittance on the outside of the pixel electrode 110 is increased to an amount greater than that in the existing structure. The pixel transmittance can be increased by this amount.

Figure 7:
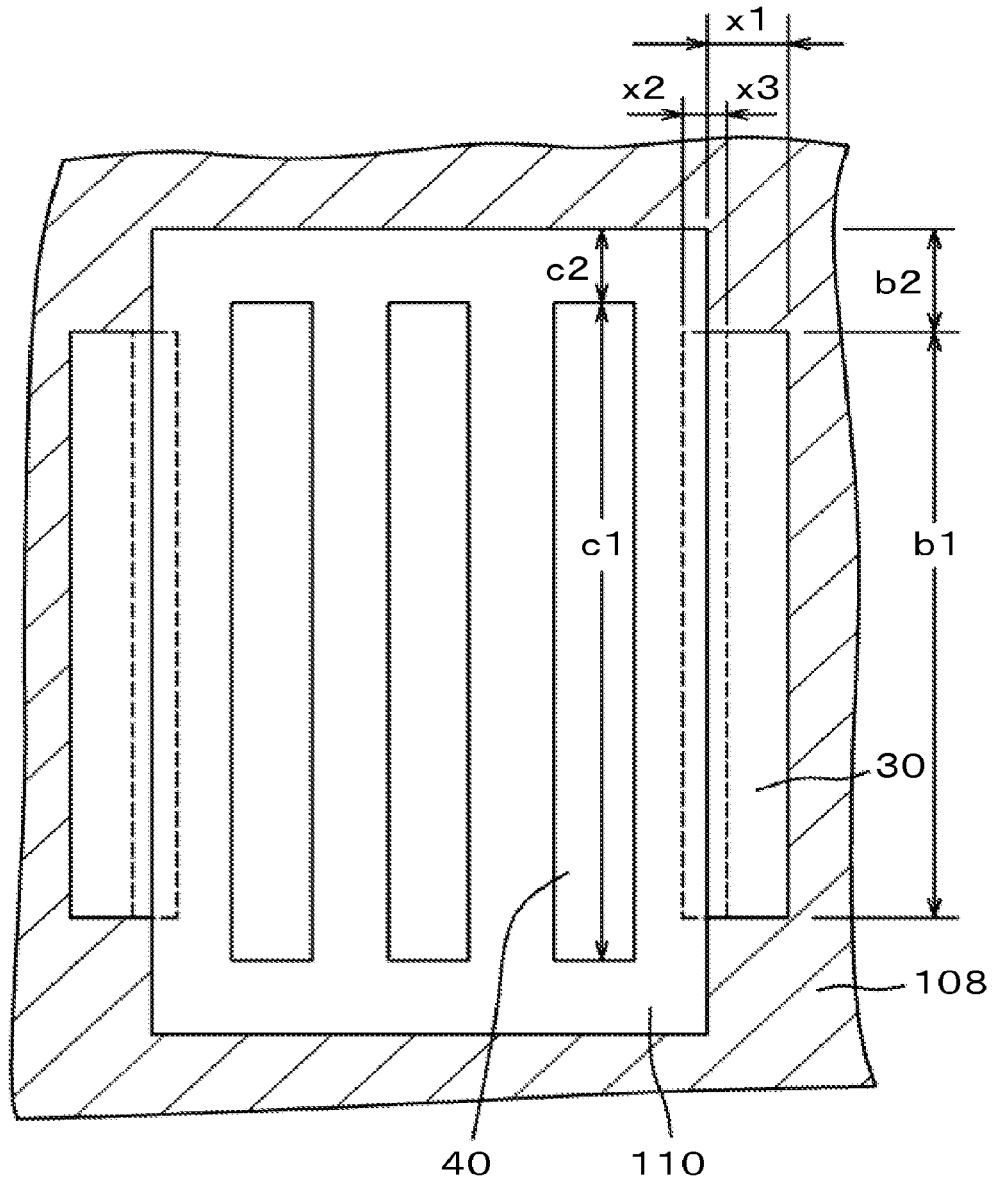
FIG. 7 is a plan view showing the relationship between a pixel and an opening of the common electrode in the present invention.

FIG. 7 is a plan view showing the details of the relationship between the pixel electrode 110 and the common electrode 108 according to the present invention. Note that the interlayer insulating film is formed between the pixel electrode 110 and the common electrode 108. The opening 30 of the common electrode 108 is formed parallel to the slit 40 of the pixel electrode 110 on the outside of the pixel electrode 110, as seen in a plan view. Preferably, the end portion of the opening 30 of the common electrode 108 on the side of the pixel electrode 110 matches the end portion of the pixel electrode 110, as seen in a plane view. The distance from the end portion of the pixel electrode 110 to the end portion of the opening 30 of the common electrode 108 on the side far from the pixel electrode 110 is $x1$. The value of $x1$ is set in the range of 0.25 to 5 µm, and more preferably, in the range of 0.5 to 3 µm.

However, due to the deviation in the alignment of a photomask, the opening 30 of the common electrode 108 may be displaced to the side of the pixel electrode 110 by $x2$, or may be displaced to the outside of the pixel electrode 110 by $x3$. If the end portion of the opening 30 is present inside the pixel electrode 110, the capacity of the pixel is reduced. On the other hand, if the end portion of the opening 30 on the side of the pixel electrode 110 is displaced to the outside away from the pixel electrode 110, the effect of the present invention is reduced. By taking into account the deviation in the photomask alignment, the distance between the end portions of the slit on the pixel electrode side, may also be made smaller than the distance between the outside end portions of the pixel electrode, that is, than the width of the pixel electrode.

Also in FIG. 7, preferably the end portion of the opening 30 of the common electrode 108 does not overlap the slit 40 of the pixel electrode 110 as seen in a plan view, even if the end portion of the opening 30 of the common electrode 108 is displaced to the inside of the pixel electrode 110. This is because the pixel capacity is significantly reduced when the end portion of the opening of the common electrode 108 is displayed to the extent that it overlaps the slit 40 of the pixel electrode 110.

In FIG. 7, when $c1$ is the length of the slit 40 of the pixel electrode 110, and when $b1$ is the length of the opening 30 of the common electrode 108, the relationship is given as $c1 \geq b1$. Further, when $c2$ is the distance from the end portion of the pixel electrode 110 to the end portion in the length direction of the slit 40, and when $b2$ is the distance from the end portion of the pixel electrode 110 to the end portion in the direction of the long axis of the opening 30 of the common electrode 108, the relationship is given as $b2 \geq c2$.

The feature of the present invention is that the opening 30 of the common electrode 108 is formed only on the outside of the pixel electrode 110 as seen in a plan view, and is not formed in the slit portion of the pixel electrode. In other words, only one opening 30 is formed on each of both sides of one pixel electrode 110. Even if the opening 30 is formed in the common electrode 108 on the inside of the pixel electrode 110 as seen in a plan view, there may be little effect of increasing the brightness. On the other hand, if the opening 30 of the common electrode 108 is formed on the inside of the pixel electrode 110 as seen in a plan view, the pixel capacity will be reduced.

Figure 8:
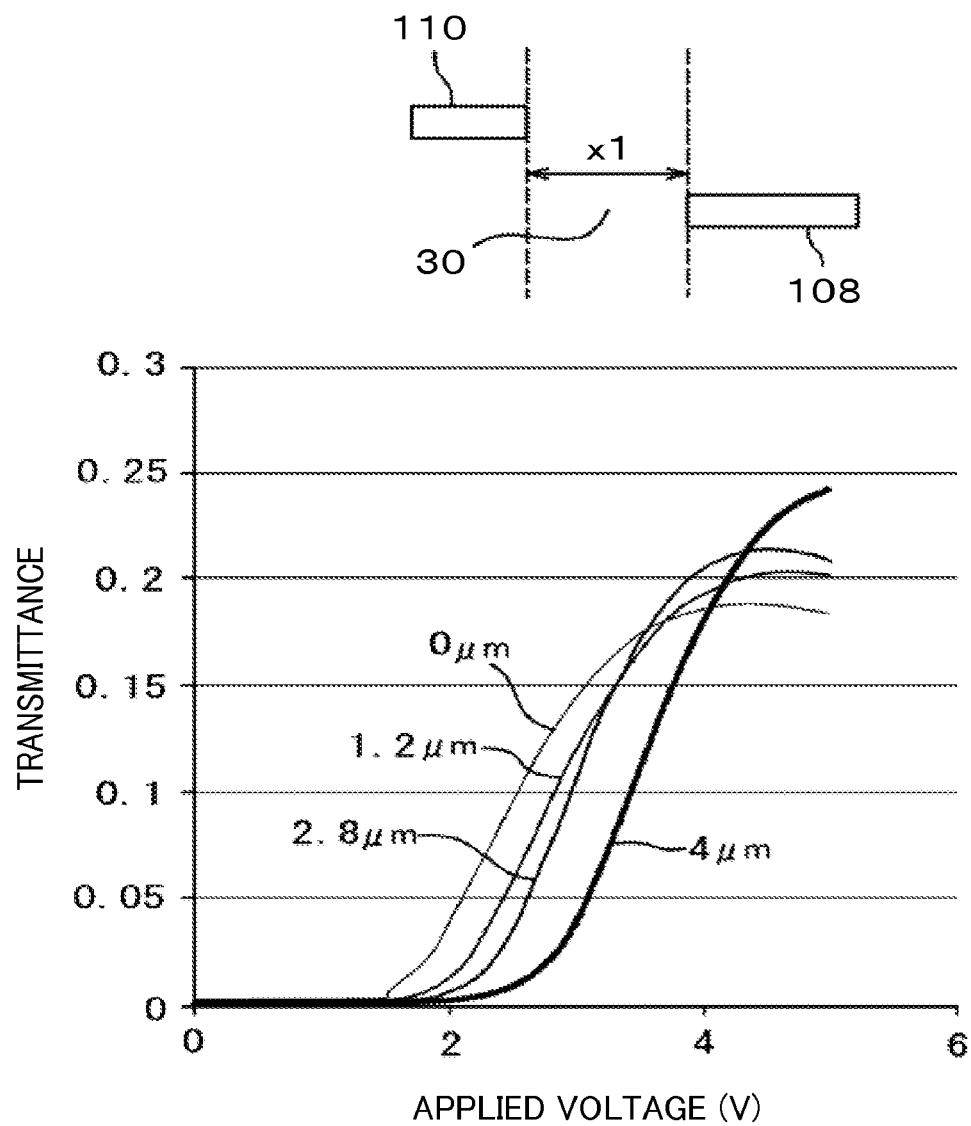
FIG. 8 is a graph showing the relationship between the voltage applied to the pixel electrode and the liquid crystal transmittance according to the present invention.

FIG. 8 is a graph showing the change in the transmittance of the liquid crystal layer, upon changing the distance $x1$ from the end portion of the pixel electrode 110 to the end portion of the opening 30 of the common electrode 108 on the side far from the pixel electrode 110. In FIG. 8, the horizontal axis is the voltage between the pixel electrode 110 and the common electrode 108, and the vertical axis is the transmittance of the liquid crystal layer. In FIG. 8, the greater the distance x1 from the end portion of the pixel electrode 110 to the end portion of the opening 30 of the common electrode 108 on the side far from the pixel electrode 110, the greater the maximum value of the transmittance. However, the greater the value of x1, the more the voltage to maximize the transmittance is shifted to the high voltage side.

Figure 9:
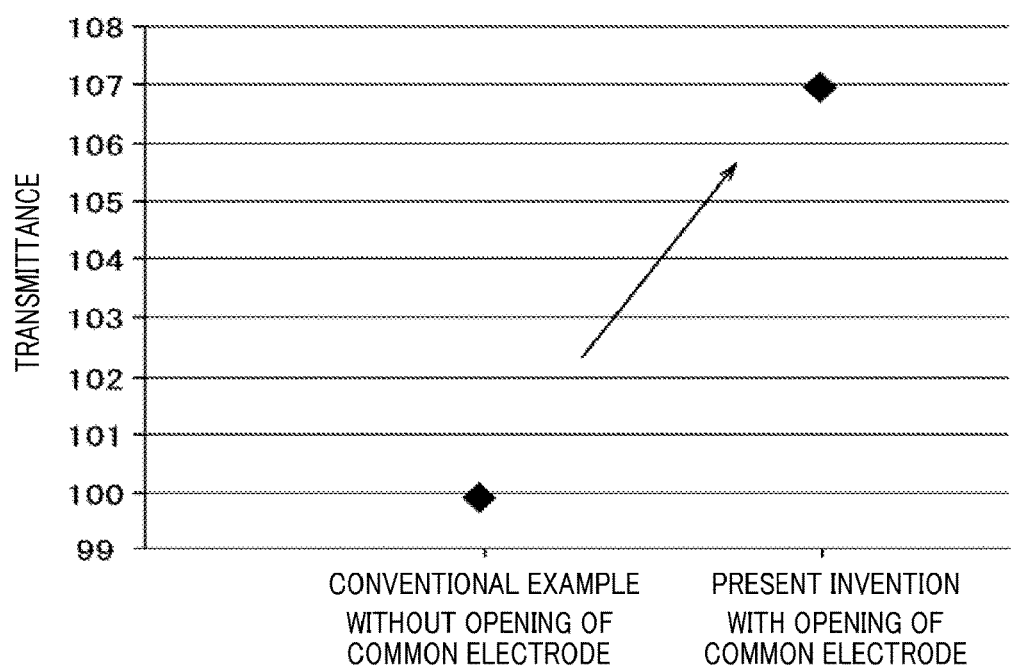
FIG. 9 is a graph showing an example of the effect of the present invention.

FIG. 9 is a graph of the comparison of the transmittance with $c1=50$ μm, $b1=30$ μm, and $x1=1.5$ μm, between the pixel structure shown in FIG. 7 and the existing structure. In FIG. 9, the horizontal axis represents the specifications of the present invention and the existing structure, that is, the presence or absence of the opening of the common electrode, while the vertical axis represents the pixel transmittance. In the case of the present invention, the transmittance is increased by 7% compared to the existing structure. In this way, the effect of the present invention is very large.

The IPS mode liquid crystal display device has excellent viewing angle characteristics. However, the viewing angle characteristics may vary depending on the azimuth angle, that is, the direction in which the screen is seen. In order to address this problem, there is a structure in which the angles of the slits of the pixel electrode with the alignment axis of the alignment film are different in one pixel. In this case, two domains are formed in one pixel and this structure is called a dual domain. The present invention can also be applied to the pixel of this structure.

Figure 10:
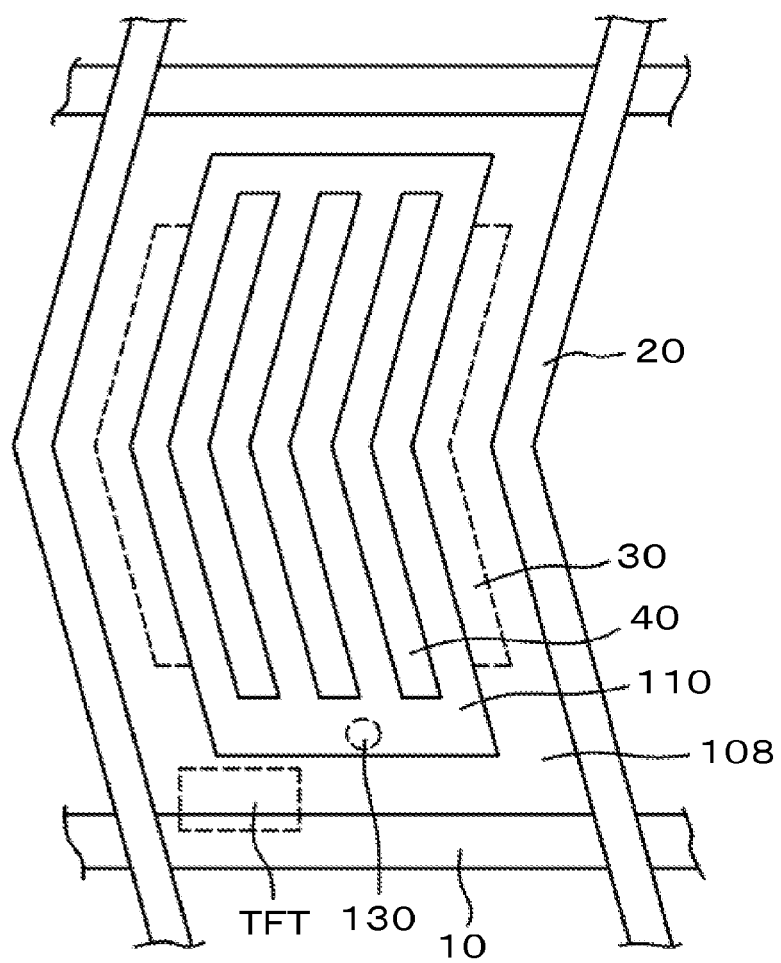
FIG. 10 is a plan view showing an example of applying the present invention to a dual-domain pixel.

FIG. 10 is an example of applying the present invention to a dual domain pixel. In FIG. 10, the pixel electrode 110 and the slit 40, which is formed inside of the pixel electrode 110, are curved in the y direction in a central portion. The direction of the alignment axis is the y direction. The angles of the long axis direction with the alignment axis on the upper and lower sides of the pixel are in an inverse relationship. In other words, the viewing angle characteristics on the upper and lower sides of the pixel are reversed in the y direction of the pixel. Thus, the viewing angle characteristics are equalized. The video signal lines 20 are curved in the y direction in a central portion of the pixel along with the pixel electrode 110.

The present invention can also be applied to such a dual domain pixel. In FIG. 10, the opening 30 of the common electrode 108 is formed on both sides of the pixel electrode 110. The opening 30 of the common electrode 108 is also curved in the y direction in a central portion along the shape of the pixel electrode 110. Others are the same as those described in FIGS. 6 to 9, except the opening 30 is curved.

Figure 11:
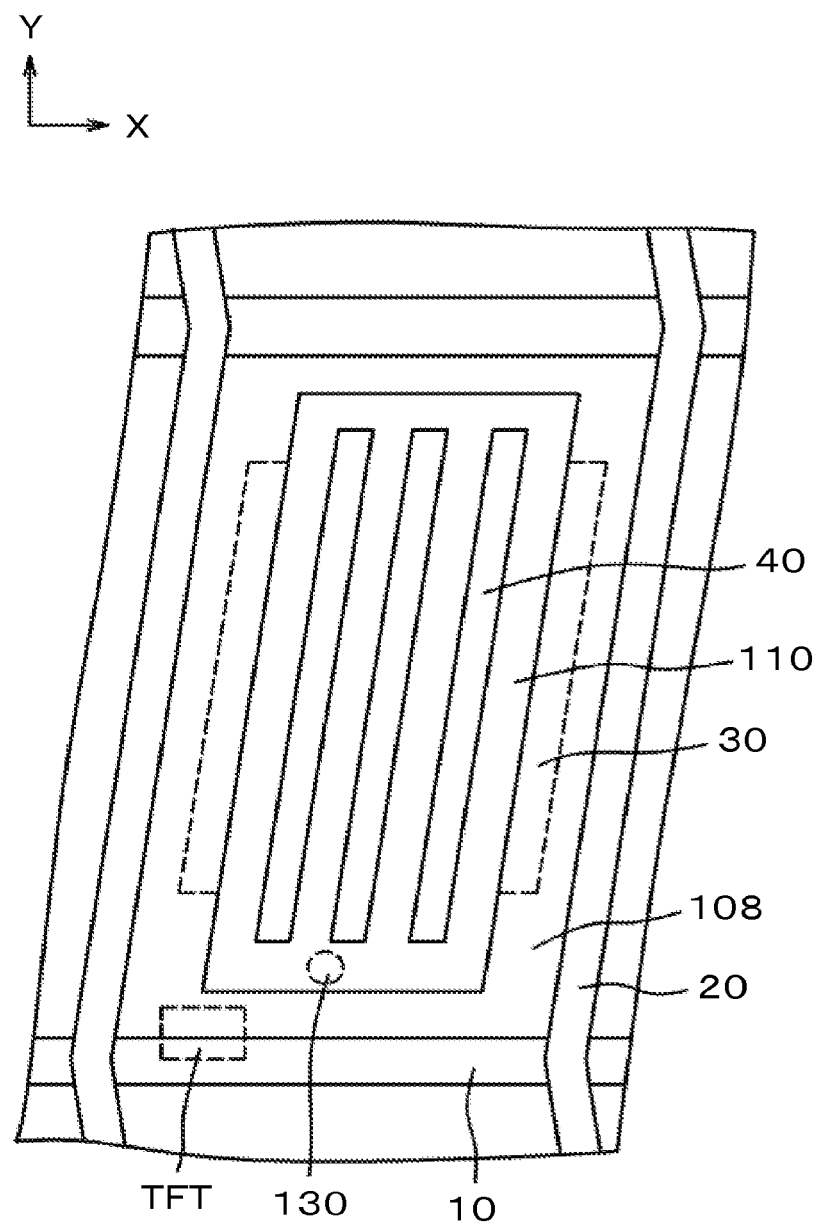
FIG. 11 is a plan view showing an example of applying the present invention to a pseudo dual-domain pixel.

FIG. 11 is an example of applying the present invention to a method for combining two pixels to equalize the azimuth characteristics of the viewing angle of the IPS mode liquid crystal display device. Such a pixel structure is referred to as a pseudo dual-domain pixel. In the pixel shown in FIG. 11, the pixel electrode 110 and the slits 40 are tilted at a predetermined angle with respect to the y axis direction. On the other hand, the pixel electrodes 110 and the slits 40 in the pixels in the y direction above and below the particular pixel are tilted in a direction reverse to the y axis direction. This makes it possible to equalize the azimuth characteristics of the viewing angle of the screen as a whole. This is called a pseudo dual-domain mode. The advantage of FIG. 11 is that there is one domain because the liquid crystal molecules in the pixel are rotated in the same direction, so that a significant disclination does not appear in the pixel.

The present invention can also be applied to the liquid crystal display device of such a pseudo dual-domain mode. In FIG. 11, the opening 30 of the common electrode 108 is formed on both sides of the pixel electrode 110. Similar to the pixel electrode 110, the opening 30 of the common electrode 108 is also tilted at a predetermined angle with respect to the y axis direction. Others are the same as those described in FIGS. 6 to 9.

In the foregoing description, it has been assumed that the number of slits 40 in the pixel electrode 110 is three, that is, the pixel electrode has the comb-like portion of four teeth. However, the prevent invention can also be applied when the number of slits 40 in the pixel electrode 110 is one, that is, the pixel electrode has a comb-like portion of two teeth, or when the pixel electrode 110 has multiple slits 40. Note that in the present specification, it is assumed that the direction of the alignment axis is the y axis direction. However, it is also possible that the alignment axis is the x direction by using a negative type liquid crystal instead of a positive type liquid crystal.

Second Embodiment

Figure 12:
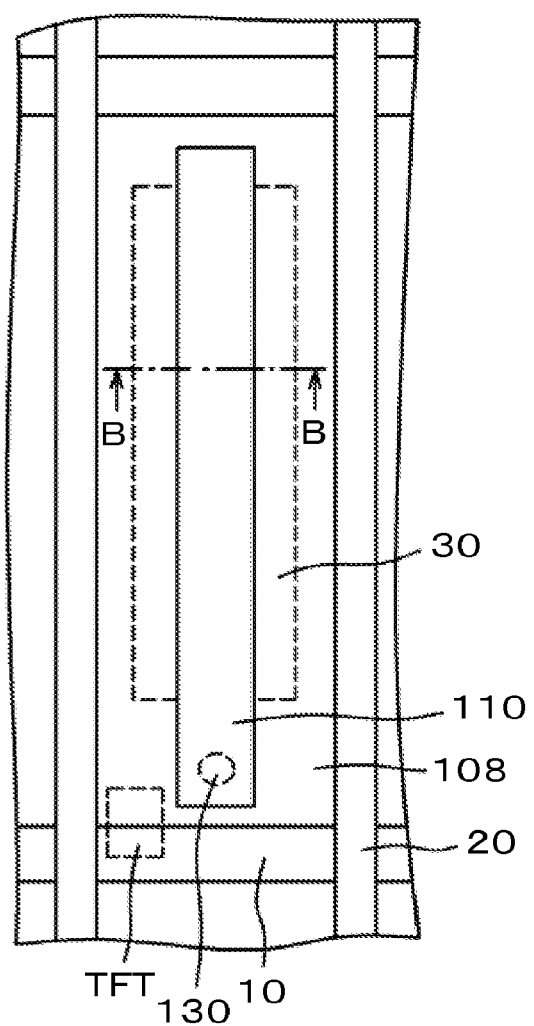
FIG. 12 is a plan view of a pixel according to a second embodiment.

FIG. 12 is a plan view of a pixel showing a second embodiment of the present invention. The feature of FIG. 12 is that the pixel electrode 110 has a comb-like portion of one tooth and has no slit. As the screen is high definition, the width of the pixel electrode may become too small to form a slit in the pixel electrode 110. The present invention can also be applied to such a pixel structure.

In FIG. 12, a pixel is formed in an area surrounded by the scanning lines 10 and the video signal lines 20. The TFT is formed in the y direction below the pixel. The pixel electrode 110 is coupled to the TFT through the through hole 130. The pixel electrode 110 extends in a strip-like shape in the y axis direction. In such a structure, the liquid crystal molecules are controlled only by the electric field lines extending from the end portion of the pixel electrode 110 to the lower layer of the common electrode 108. For this reason, the control ability to the liquid crystal layer is smaller than that of the electric field lines extending to the common electrode through the slit of the pixel electrode 110.

Accordingly, in the present embodiment, the opening 30 of the common electrode 108 is formed on both sides of the pixel electrode 110 with no slit, to allow the electric field lines to penetrate into the layer above the liquid crystal layer, and to allow the electric field lines to reach further away from the pixel electrode 110. In this way, it is possible to increase the control ability to the liquid crystal layer.

Figure 13:
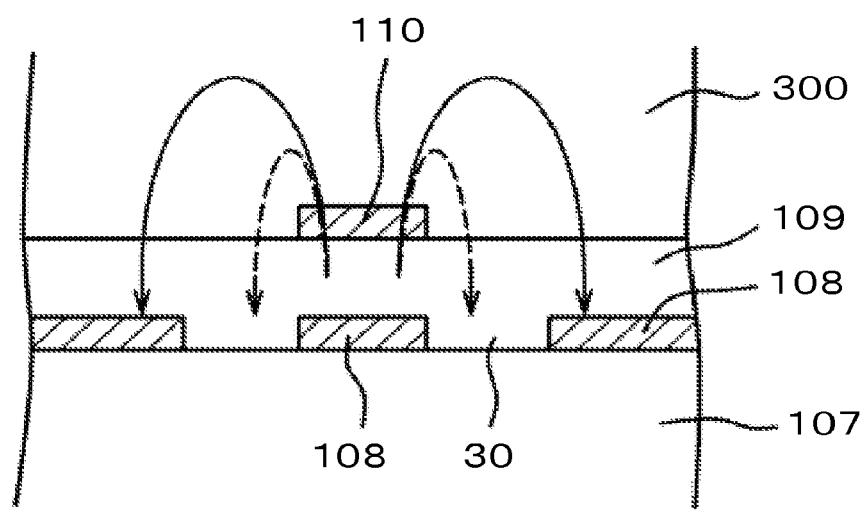
FIG. 13 is a cross-sectional view showing the operation of the second embodiment.
Figure 14:
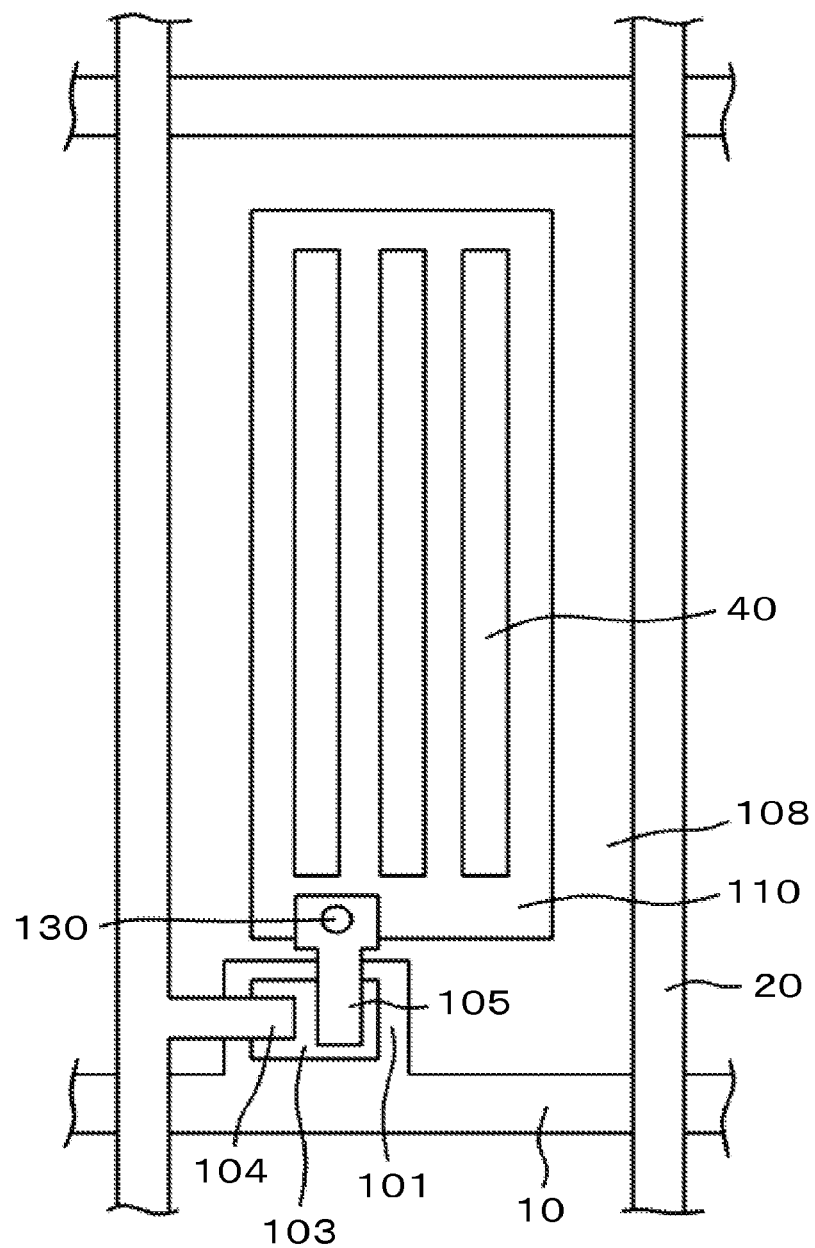
FIG. 14 is a plan view showing a pixel in the conventional example.

FIG. 13 is a cross-sectional view showing this state. FIG. 13 corresponds to a cross-sectional view taken along line B-B of FIG. 12. In FIG. 13, the dashed line shows the state of the electric field lines when there is no opening in the common electrode 108 as in the existing structure. The solid line shows the electric filed lines when the opening 30 is present in the common electrode 108 as in the present embodiment. As shown clearly in FIG. 13, the electric field lines reach the layer above the liquid crystal layer 300, and reach further away from the end portion of the pixel electrode 110, because the opening 30 is present in the common electrode 108. Thus, it is possible to operate the liquid crystal molecules more effectively and to increase the pixel transmittance. Further, the common electrode 108 is formed below the pixel electrode 110, so that the retention volume can be ensured.

The detailed structure of forming the opening 30 of the common electrode 108 on both sides of the pixel electrode 110 with no slit, as well as the effect of such a structure are the same as described in FIGS. 6 to 9. Note that in the present specification, the pixel electrode 110 and the common electrode 108 are formed by a transparent conductive film, for example, by ITO or IZO.

As described above, the present invention can increase the pixel transmittance. As a result, the brightness of the screen can be increased.

What is claimed is:

1. A display device comprising:
   a TFT substrate having scanning lines extending in a first direction, video signal lines extending in a second direction crossing the first direction, a first electrode overlapped with the scanning lines and the video signal lines, an insulating film formed on the first electrode, and a second electrode formed on the insulating film overlapping with the first electrode; and
   a counter substrate opposed to the TFT substrate;
   wherein the second electrode is formed in an area surrounded by the scanning lines and the video lines,
   the first electrode has an opening formed in the area,
   the opening is formed along the second electrode and an edge of the opening in the first direction is apart from the second electrode, in a plan view, and
   the edge of the opening is between the second electrode and the video signal lines, in a plan view.

2. The display device according to claim 1, wherein the distance is in the range of 0.25 μm to 5 μm.

3. The display device according to claim 1, wherein the distance is in the range of 0.5 μm to 3 μm.

4. The display device according to claim 1, wherein the opening does not overlap the video signal line as seen in a plan view.

5. The display device according to claim 1, wherein the opening does not overlap the scanning line as seen in a plan view.

6. The display device according to claim 1, wherein the opening is formed between the video signal line and the second electrode, wherein a part of the opening overlaps with the second electrode.

7. The display device according to claim 1, wherein the second electrode is a line shape electrode and does not have a slit.

8. The display device according to claim 1, wherein the opening does not overlap with the second electrode, in a plan view.

9. The display device according to claim 8, wherein the opening includes a first opening and a second opening, and the second electrode is between the first opening and the second opening, in a plan view.

10. The display device according to claim 9, wherein the second electrode opposes to the first electrode between the first opening and the second opening.

11. The display device according to claim 1, wherein the TFT substrate has a thin film transistor in the area, and the second electrode is connected to the thin film transistor through a through hole.

12. The display device according to claim 11, wherein the first electrode has a hole corresponding to the through hole, and the hole and the opening are not connected.

* * * * *